United States Patent
Zhang et al.

(10) Patent No.: US 9,285,929 B2
(45) Date of Patent: Mar. 15, 2016

(54) TOUCHSCREEN SYSTEM WITH SIMPLIFIED MECHANICAL TOUCHSCREEN DESIGN USING CAPACITANCE AND ACOUSTIC SENSING TECHNOLOGIES, AND METHOD THEREFOR

(75) Inventors: Hai Long Zhang, Buji Town (CN); De Xian Dai, Huixing Town (CN)

(73) Assignee: New Vision Display (Shenzhen) Co., Limited, Shenzhen (CN)

( * ) Notice: Subject to any disclaimer, the term of this patent is extended or adjusted under 35 U.S.C. 154(b) by 1368 days.

(21) Appl. No.: 12/750,321

(22) Filed: Mar. 30, 2010

(65) Prior Publication Data

US 2011/0242001 A1    Oct. 6, 2011

(51) Int. Cl.
*G06F 3/041* (2006.01)
*G06F 3/043* (2006.01)
*G06F 3/044* (2006.01)

(52) U.S. Cl.
CPC .............. *G06F 3/043* (2013.01); *G06F 3/044* (2013.01); *G06F 2203/04103* (2013.01); *G06F 2203/04106* (2013.01)

(58) Field of Classification Search
CPC ................................. G06F 3/043; G06F 3/044
See application file for complete search history.

(56) References Cited

U.S. PATENT DOCUMENTS

| | | | |
|---|---|---|---|
| 4,290,052 A * | 9/1981 | Eichelberger et al. | .......... 341/33 |
| 4,550,221 A | 10/1985 | Mabusth | |
| 5,062,198 A | 11/1991 | Sun | |
| 5,379,057 A | 1/1995 | Clough et al. | |
| 5,459,463 A | 10/1995 | Gruaz et al. | |
| 5,488,204 A | 1/1996 | Mead et al. | |
| 5,495,077 A | 2/1996 | Miller et al. | |
| 5,543,588 A | 8/1996 | Bisset et al. | |
| 5,543,590 A | 8/1996 | Gillespie et al. | |

(Continued)

FOREIGN PATENT DOCUMENTS

| | | |
|---|---|---|
| CN | 1838151 A | 9/2006 |
| CN | 101122839 A | 2/2008 |

(Continued)

OTHER PUBLICATIONS

Touchscreenguide.com (http://www.touchscreenguide.com/touchscreen/res.html), as printed from the internet on Oct. 28, 2011, 1 pg.

(Continued)

*Primary Examiner* — Joseph Feild
*Assistant Examiner* — Karin A. Kiyabu
(74) *Attorney, Agent, or Firm* — Marsh Fischmann & Breyfogle LLP; Jonathon A. Szumny; Robert G. Crouch (57) ABSTRACT

A simplified touch screen system that can sense when an object is held in continuous direct or indirect contact with a transparent substrate of the touch screen system as well as determine a location (e.g., X, Y coordinates) of the object in relation to the transparent substrate. The touch screen system employs capacitance technology to sense whether the object is held in contact with the transparent substrate and acoustic sensing technology to determine a position of the object that is contacting the transparent substrate. The touch screen system requires a reduced number of shielding and isolation layers to be deposited upon the transparent substrate, partially because the touch screen system utilizes a bezel associated with an underlying display to provide shielding against electromagnetic radiation emitted by the display.

26 Claims, 6 Drawing Sheets

(56) References Cited

U.S. PATENT DOCUMENTS

| | | |
|---|---|---|
| 5,543,592 A | 8/1996 | Gaultier et al. |
| 5,650,597 A | 7/1997 | Redmayne |
| 5,675,362 A | 10/1997 | Clough et al. |
| 5,730,165 A | 3/1998 | Philipp |
| 5,825,352 A | 10/1998 | Bisset et al. |
| 5,841,078 A | 11/1998 | Miller et al. |
| 5,844,506 A * | 12/1998 | Binstead ............... 341/34 |
| 5,854,450 A | 12/1998 | Kent |
| 5,854,625 A | 12/1998 | Frisch et al. |
| 5,861,583 A | 1/1999 | Schediwy et al. |
| 5,880,411 A | 3/1999 | Gillespie et al. |
| 5,920,310 A | 7/1999 | Faggin et al. |
| 5,940,065 A | 8/1999 | Babb et al. |
| 5,943,052 A | 8/1999 | Allen et al. |
| 6,091,406 A | 7/2000 | Kambara et al. |
| 6,188,391 B1 | 2/2001 | Seely et al. |
| 6,236,391 B1 | 5/2001 | Kent et al. |
| 6,288,707 B1 | 9/2001 | Philipp |
| 6,297,811 B1 | 10/2001 | Kent et al. |
| 6,373,474 B1 | 4/2002 | Katabami |
| 6,379,509 B2 | 4/2002 | Choi et al. |
| 6,380,929 B1 | 4/2002 | Platt |
| 6,380,931 B1 | 4/2002 | Gillespie et al. |
| 6,414,671 B1 | 7/2002 | Gillespie et al. |
| 6,441,809 B2 | 8/2002 | Kent et al. |
| 6,452,514 B1 | 9/2002 | Philipp |
| 6,466,036 B1 | 10/2002 | Philipp |
| 6,488,981 B1 | 12/2002 | Richter et al. |
| 6,492,979 B1 | 12/2002 | Kent et al. |
| 6,504,530 B1 | 1/2003 | Wilson et al. |
| 6,504,583 B2 | 1/2003 | Li et al. |
| 6,506,983 B1 | 1/2003 | Babb et al. |
| 6,535,200 B2 | 3/2003 | Philipp |
| 6,549,193 B1 | 4/2003 | Huang et al. |
| 6,555,235 B1 | 4/2003 | Aufderheide et al. |
| 6,587,097 B1 | 7/2003 | Aufderheide et al. |
| 6,723,929 B2 | 4/2004 | Kent |
| 6,738,051 B2 | 5/2004 | Boyd et al. |
| 6,750,852 B2 | 6/2004 | Gillespie et al. |
| 6,781,579 B2 | 8/2004 | Huang et al. |
| 6,784,873 B1 | 8/2004 | Boesen et al. |
| 6,809,280 B2 | 10/2004 | Divigalpitiya et al. |
| 6,819,316 B2 | 11/2004 | Schulz et al. |
| 6,825,833 B2 | 11/2004 | Mulligan et al. |
| 6,842,171 B2 | 1/2005 | Richter et al. |
| 6,856,259 B1 | 2/2005 | Sharp |
| 6,904,570 B2 | 6/2005 | Foote et al. |
| 6,927,761 B2 | 8/2005 | Badaye et al. |
| 6,943,705 B1 | 9/2005 | Bolender et al. |
| 6,961,049 B2 | 11/2005 | Mulligan et al. |
| 6,970,160 B2 | 11/2005 | Mulligan et al. |
| 6,977,646 B1 | 12/2005 | Hauck et al. |
| 6,993,607 B2 | 1/2006 | Philipp |
| 7,000,474 B2 | 2/2006 | Kent |
| 7,006,081 B2 | 2/2006 | Kent et al. |
| 7,030,860 B1 | 4/2006 | Hsu et al. |
| 7,061,475 B2 | 6/2006 | Kent |
| 7,102,621 B2 | 9/2006 | Roberts |
| 7,109,976 B2 | 9/2006 | Cobian |
| 7,109,978 B2 | 9/2006 | Gillespie et al. |
| 7,129,935 B2 | 10/2006 | Mackey |
| 7,148,704 B2 | 12/2006 | Philipp |
| 7,148,882 B2 | 12/2006 | Kamrath et al. |
| 7,151,532 B2 | 12/2006 | Schulz |
| 7,154,481 B2 | 12/2006 | Cross et al. |
| 7,158,122 B2 | 1/2007 | Roberts |
| 7,176,897 B2 | 2/2007 | Roberts |
| 7,176,902 B2 | 2/2007 | Peterson, Jr. et al. |
| 7,183,948 B2 | 2/2007 | Roberts |
| 7,190,350 B2 | 3/2007 | Roberts |
| 7,190,352 B2 | 3/2007 | Ling et al. |
| 7,196,694 B2 | 3/2007 | Roberts |
| 7,202,859 B1 | 4/2007 | Speck et al. |
| 7,212,189 B2 | 5/2007 | Shaw et al. |
| 7,227,538 B2 | 6/2007 | Geaghan et al. |
| 7,236,161 B2 | 6/2007 | Geaghan et al. |
| 7,253,643 B1 | 8/2007 | Seguine |
| 7,253,809 B2 | 8/2007 | Boyd et al. |
| 7,254,775 B2 | 8/2007 | Geaghan et al. |
| 7,256,714 B2 | 8/2007 | Philipp |
| 7,277,087 B2 | 10/2007 | Hill et al. |
| 7,279,647 B2 | 10/2007 | Philipp |
| 7,295,190 B2 | 11/2007 | Philipp |
| 7,298,367 B2 | 11/2007 | Geaghan et al. |
| 7,303,809 B2 | 12/2007 | Choi et al. |
| 7,307,624 B2 | 12/2007 | Geaghan et al. |
| 7,315,300 B2 | 1/2008 | Hill et al. |
| 7,327,352 B2 | 2/2008 | Keefer et al. |
| 7,339,579 B2 | 3/2008 | Richter et al. |
| 7,515,140 B2 | 4/2009 | Philipp |
| 7,821,425 B2 | 10/2010 | Philipp |
| 7,821,502 B2 | 10/2010 | Hristov |
| 7,825,905 B2 | 11/2010 | Philipp |
| 7,903,092 B2 | 3/2011 | Philipp |
| 7,932,898 B2 | 4/2011 | Philipp et al. |
| 7,945,297 B2 | 5/2011 | Philipp |
| 7,969,330 B2 | 6/2011 | Philipp |
| 2001/0026330 A1 | 10/2001 | Oh |
| 2002/0030666 A1 | 3/2002 | Philipp |
| 2002/0145593 A1 | 10/2002 | Boyd et al. |
| 2002/0191029 A1 | 12/2002 | Gillespie et al. |
| 2003/0001826 A1 | 1/2003 | Richter et al. |
| 2003/0095111 A1 | 5/2003 | Song et al. |
| 2003/0103043 A1 | 6/2003 | Mulligan et al. |
| 2003/0132922 A1 | 7/2003 | Philipp |
| 2003/0137498 A1 | 7/2003 | Huang et al. |
| 2003/0184523 A1 | 10/2003 | Badaye et al. |
| 2003/0205450 A1 | 11/2003 | Divigalpitiya et al. |
| 2004/0008129 A1 | 1/2004 | Philipp |
| 2004/0061687 A1 | 4/2004 | Kent et al. |
| 2004/0100448 A1 | 5/2004 | Moshrefzadeh |
| 2004/0104826 A1 | 6/2004 | Philipp |
| 2004/0135773 A1 | 7/2004 | Bang et al. |
| 2004/0178997 A1 | 9/2004 | Gillespie et al. |
| 2004/0188150 A1 | 9/2004 | Richard et al. |
| 2004/0189882 A1 | 9/2004 | Jeong et al. |
| 2004/0252109 A1 | 12/2004 | Trent, Jr. et al. |
| 2005/0024341 A1 | 2/2005 | Gillespie et al. |
| 2005/0035953 A1 | 2/2005 | Woolley et al. |
| 2005/0041018 A1 | 2/2005 | Philipp |
| 2005/0052429 A1 | 3/2005 | Philipp |
| 2005/0078027 A1 | 4/2005 | Philipp |
| 2005/0110766 A1 | 5/2005 | Kent et al. |
| 2005/0110767 A1 | 5/2005 | Gomes et al. |
| 2005/0162408 A1 | 7/2005 | Martchovsky |
| 2005/0174335 A1 | 8/2005 | Kent et al. |
| 2005/0179673 A1 | 8/2005 | Philipp |
| 2005/0246459 A1 | 11/2005 | Philipp |
| 2005/0260338 A1 | 11/2005 | Chien |
| 2006/0038793 A1 | 2/2006 | Philipp |
| 2006/0092142 A1 | 5/2006 | Gillespie et al. |
| 2006/0097991 A1 | 5/2006 | Hotelling et al. |
| 2006/0132453 A1 | 6/2006 | Boyd et al. |
| 2006/0132462 A1 | 6/2006 | Geaghan |
| 2006/0139340 A1 | 6/2006 | Geaghan |
| 2006/0187214 A1 | 8/2006 | Gillespie et al. |
| 2006/0187216 A1 | 8/2006 | Trent, Jr. et al. |
| 2006/0192690 A1 | 8/2006 | Philipp |
| 2006/0202969 A1 | 9/2006 | Hauck |
| 2006/0202970 A1 | 9/2006 | Lii et al. |
| 2006/0207806 A1 | 9/2006 | Philipp |
| 2006/0238513 A1 | 10/2006 | Philipp |
| 2006/0274047 A1 | 12/2006 | Spath et al. |
| 2006/0274055 A1 | 12/2006 | Reynolds et al. |
| 2006/0279548 A1* | 12/2006 | Geaghan ............... 345/173 |
| 2006/0284836 A1 | 12/2006 | Philipp |
| 2007/0002192 A1 | 1/2007 | Nishino et al. |
| 2007/0008299 A1 | 1/2007 | Hristov |
| 2007/0013671 A1* | 1/2007 | Zadesky et al. ............... 345/173 |
| 2007/0026089 A1 | 2/2007 | Hu |
| 2007/0052690 A1 | 3/2007 | Roberts |
| 2007/0062739 A1 | 3/2007 | Philipp et al. |
| 2007/0074914 A1 | 4/2007 | Geaghan et al. |
| 2007/0085838 A1 | 4/2007 | Ricks et al. |

(56) References Cited

U.S. PATENT DOCUMENTS

| | | |
|---|---|---|
| 2007/0091076 A1 | 4/2007 | Schulz |
| 2007/0103446 A1 | 5/2007 | Chien et al. |
| 2007/0109274 A1 | 5/2007 | Reynolds |
| 2007/0159561 A1 | 7/2007 | Chien |
| 2007/0176906 A1 | 8/2007 | Warren |
| 2007/0188476 A1* | 8/2007 | Bayramoglu et al. ........ 345/177 |
| 2007/0222766 A1 | 9/2007 | Bolender |
| 2007/0229466 A1 | 10/2007 | Peng et al. |
| 2007/0229468 A1 | 10/2007 | Peng et al. |
| 2007/0229470 A1 | 10/2007 | Snyder et al. |
| 2007/0236475 A1 | 10/2007 | Wherry |
| 2007/0236478 A1 | 10/2007 | Geaghan et al. |
| 2007/0236618 A1 | 10/2007 | Maag et al. |
| 2007/0247443 A1 | 10/2007 | Philipp |
| 2007/0257893 A1 | 11/2007 | Philipp et al. |
| 2007/0257894 A1 | 11/2007 | Philipp |
| 2007/0262962 A1 | 11/2007 | XiaoPing et al. |
| 2007/0262963 A1 | 11/2007 | Xiao-Ping et al. |
| 2007/0264844 A1 | 11/2007 | Hu |
| 2007/0268265 A1 | 11/2007 | XiaoPing |
| 2007/0268266 A1 | 11/2007 | XiaoPing |
| 2007/0268276 A1 | 11/2007 | Kent et al. |
| 2007/0273560 A1 | 11/2007 | Hua et al. |
| 2007/0273561 A1 | 11/2007 | Philipp |
| 2007/0279395 A1 | 12/2007 | Philipp et al. |
| 2007/0291009 A1 | 12/2007 | Wright et al. |
| 2007/0291016 A1 | 12/2007 | Philipp |
| 2007/0296709 A1 | 12/2007 | GuangHai |
| 2008/0001925 A1 | 1/2008 | XiaoPing |
| 2008/0007434 A1 | 1/2008 | Hristov |
| 2008/0007534 A1 | 1/2008 | Peng et al. |
| 2008/0012832 A1 | 1/2008 | GuangHai |
| 2008/0018618 A1 | 1/2008 | Hill et al. |
| 2008/0024461 A1 | 1/2008 | Richter et al. |
| 2008/0029292 A1 | 2/2008 | Takayama et al. |
| 2008/0041641 A1 | 2/2008 | Geaghan et al. |
| 2008/0042994 A1 | 2/2008 | Gillespie et al. |
| 2008/0048978 A1 | 2/2008 | Trent, Jr. et al. |
| 2008/0048997 A1 | 2/2008 | Gillespie et al. |
| 2008/0062139 A1 | 3/2008 | Hotelling et al. |
| 2008/0074398 A1 | 3/2008 | Wright |
| 2008/0111714 A1 | 5/2008 | Kremin |
| 2008/0122802 A1 | 5/2008 | Furuhashi et al. |
| 2008/0138589 A1 | 6/2008 | Wakabayashi et al. |
| 2008/0142352 A1 | 6/2008 | Wright |
| 2008/0143683 A1 | 6/2008 | Hotelling |
| 2008/0150905 A1 | 6/2008 | Grivna et al. |
| 2008/0150906 A1 | 6/2008 | Grivna |
| 2008/0158181 A1 | 7/2008 | Hamblin et al. |
| 2008/0158183 A1 | 7/2008 | Hotelling et al. |
| 2008/0165139 A1 | 7/2008 | Hotelling et al. |
| 2008/0165158 A1 | 7/2008 | Hotelling et al. |
| 2008/0264699 A1 | 10/2008 | Chang et al. |
| 2008/0309635 A1 | 12/2008 | Matsuo |
| 2009/0008160 A1* | 1/2009 | Aroyan et al. ............. 178/18.01 |
| 2009/0085891 A1 | 4/2009 | Yang et al. |
| 2009/0135151 A1* | 5/2009 | Sun ................ 345/173 |
| 2009/0160817 A1* | 6/2009 | Wu et al. ........................ 345/173 |
| 2009/0160824 A1 | 6/2009 | Chih-Yung et al. |
| 2009/0167710 A1 | 7/2009 | Jiang et al. |
| 2009/0194344 A1 | 8/2009 | Harley et al. |
| 2009/0236151 A1 | 9/2009 | Yeh et al. |
| 2009/0309850 A1 | 12/2009 | Yang |
| 2010/0024573 A1* | 2/2010 | Daverman et al. ........ 73/862.626 |
| 2010/0026655 A1* | 2/2010 | Harley ............................ 345/174 |
| 2010/0045625 A1 | 2/2010 | Yang et al. |
| 2010/0066700 A1 | 3/2010 | Mozdzyn |
| 2010/0073319 A1 | 3/2010 | Lyon et al. |
| 2010/0078230 A1* | 4/2010 | Rosenblatt et al. ......... 178/18.01 |
| 2010/0085326 A1* | 4/2010 | Anno ............................ 345/174 |
| 2010/0271330 A1 | 10/2010 | Philipp |
| 2010/0309145 A1* | 12/2010 | Chiang et al. .................. 345/173 |
| 2011/0012845 A1* | 1/2011 | Rothkopf et al. ............. 345/173 |
| 2011/0157085 A1 | 6/2011 | Philipp |
| 2013/0057502 A1* | 3/2013 | Aklil .................... G06F 3/0418 |
| | | 345/174 |

FOREIGN PATENT DOCUMENTS

| | | |
|---|---|---|
| JP | 2004280720 A | 10/2004 |
| KR | 10-2007-0081902 A | 8/2007 |
| KR | 100907512 B1 | 7/2009 |

OTHER PUBLICATIONS

Adler, R., et al., An Economical Touch Panel using SAW Absorption, IEEE Transactions on Ultrasonics, Ferroelectrics and Frequency Control, Mar. 1987, vol. 34, No. 2, pp. 195-201.

* cited by examiner

TOUCHSCREEN SYSTEM WITH SIMPLIFIED MECHANICAL TOUCHSCREEN DESIGN USING CAPACITANCE AND ACOUSTIC SENSING TECHNOLOGIES, AND METHOD THEREFOR

BACKGROUND

A variety of electronic devices employ touch screens or touch panels to detect the presence and location of a touch within a display area of the electronic device, generally by a finger, hand, or other object. Such electronic devices include mobile phones, internet devices, portable game consoles, portable readers, music players, navigation devices, appliances, automation and control electronics, laptop computers, television screens, and the like. Touch screens allow for direct interaction with what is displayed on the screen where it is displayed, rather than indirect interaction through a mouse or separate touch pad. Touch screens also enable such interaction without requiring any intermediate devices, such as a stylus that must be held in a user's hand.

There are a number of touch screen technologies, and from among these various technologies, acoustic touch screen technology has emerged as a durable and accurate technology that functions even when the screen itself is dirty or scratched. Acoustic touch screen technology involves using acoustic transducers to convert the mechanical or acoustic energy generated by a physical contact with a touch screen substrate into an electronic signal. Hardware and software that is operatively connected to the transducers then analyzes the electronic signal to determine the location of the contact. Because no acoustic energy is generated when the finger or other object lies motionless against the screen, acoustic sensing technology is unable to detect when a finger is held against the screen after an initial contact.

One proposed solution to this problem includes a capacitive sensing mechanism that employs conductive wire to connect a number of capacitors in series along one or more borders of the touch screen substrate. Each of the capacitors includes two electrodes that are spaced a distance apart. When a user touches a surface of the screen substrate with an object such as a finger, the electrodes to move towards one another, thereby reducing the gap between the electrodes and causing a capacitance variation that can be converted into a binary signal representing a "hold" or "release" action in relation to a contact with the touch screen. Further, to shield against electromagnetic interference from both the environment and an associated display, known touch screen systems employ a number of conductive and insulating layers deposited upon the screen substrate.

While the existing approach allows the touch screen system to sense when an object is in continuous contact with the screen, it has many shortcomings. For instance, using soldered wires to interconnect the capacitors in series is a time-consuming manual process that introduces variance into the system and reduces the quality and reliability of the hold-and-release sensing. In addition, depositing numerous conductive and insulating layers onto the screen substrate to adequately shield against noise caused by electromagnetic radiation consumes a great deal of material, much of which is lost during the printing process, rendering the manufacturing process unduly wasteful and expensive. Further, existing acoustic and capacitive touch screen systems have required dedicated connectors to link both the acoustic and the capacitive sensing components on the screen substrate with the processing components on an associated control board. These dual connectors enlarge the space required for the touch screen system and render the system too bulky for many compact electronic devices.

It is against this background that the teachings herein have been developed.

SUMMARY

Disclosed herein is a touch screen system for an electronic device having a power source and a touch screen control board. The touch screen system includes a transparent substrate having an external surface and an internal surface, the transparent substrate for receiving a contact from an object upon the external surface; deposited layers arranged about a perimeter of the internal surface of the transparent substrate, the deposited layers consisting of a conductive layer deposited upon the internal surface of the transparent substrate, where the conductive layer forms a pattern of conductive traces, and an isolation layer deposited upon the conductive layer; one or more acoustic sensors associated with the transparent substrate, where the acoustic sensors receive an acoustic wave generated by the contact and convert the acoustic wave to an electronic signal, and where the acoustic sensors are electrically connected through a first one of the conductive traces; and a plurality of capacitive sensors associated with the transparent substrate, each of the capacitive sensors comprising a first electrode that is spaced a distance from a second electrode, where each of the first electrodes is both formed by and electrically connected through a second one of the conductive traces and each of the second electrodes is electrically connected through a third one of the conductive traces, and where the contact of the object causes a capacitive change in the capacitive sensors.

The touch screen system may further include a processor for monitoring the electronic signal and the capacitive change. The processor may analyze the electronic signal to determine a location of the object upon the transparent substrate and monitor the capacitive change to determine whether the object remains in continuous contact with the transparent substrate. The system may also include one flexible printed circuit (FPC) connector that electrically connects each of the conductive traces with the touch screen board. Moreover, the touch screen system may further include a compressible gasket situated between the first and second electrodes of each of the capacitive sensors. The compressible gasket may be formed of a double-sided foam tape.

One of the capacitive sensors may be positioned at an approximate middle point along each edge of the internal surface of the transparent substrate. Each of the second electrodes may include a first electrically conductive area deposited upon a first side of an FPC strip. The FPC strip may include a second side having a second electrically conductive area, and the second electrically conductive area may be grounded through a fourth one of the conductive traces such that the second electrically conductive area provides electromagnetic radiation shielding. The object may be a finger, and the acoustic wave may be a bending wave.

The touch screen system may further include a display having an active display area and a conductive bezel framing a perimeter of the active display area. The conductive bezel may shield the acoustic sensors, the capacitive sensors, and the conductive traces from electromagnetic radiation emitted from the display.

Also disclosed is a method of analyzing a contact from an object upon a touch screen system. The method includes providing a transparent substrate having external and internal surfaces; depositing layers, other than shielding layers, on the internal surface of the transparent substrate, the depositing including depositing a layer of conductive material to form an annular pattern of conductive traces about a perimeter of the internal surface of the transparent substrate, where the conductive traces form a plurality of first electrodes, and depositing a layer of insulating material upon the layer of conductive material; connecting a plurality of second electrodes to the conductive traces, where each of the second electrodes is spaced a distance from one of the first electrodes such that each pair of the first and the second electrodes forms a capacitive sensor, and wherein the contact of the object causes a capacitive change in the capacitive sensors; and connecting one or more acoustic sensors to the conductive traces, wherein the acoustic sensors receive an acoustic wave generated by the contact from the object and convert the acoustic wave to an electronic signal.

The method may further include associating a processor with the conductive traces and, upon the contact of the object with the external surface of the transparent substrate, using the processor to monitor the electronic signal to determine a location of the object upon the transparent substrate and to monitor the capacitive change to determine whether the object remains in continuous contact with the transparent substrate.

Each of the second electrodes may include a first electrically conductive area deposited upon a first side of an FPC strip. The FPC strip may include a second side having a second electrically conductive area, and the method may further include grounding the second electrically conductive area through the conductive traces such that the second electrically conductive area provides electromagnetic radiation shielding.

The method may further include associating a display and a conductive bezel with the transparent substrate, where the display has an active display area and the conductive bezel frames a perimeter of the active display area such that the bezel aligns with the layer of conductive material, and grounding the conductive bezel such that the bezel shields the acoustic sensors, the capacitive sensors, and the conductive traces from electromagnetic radiation emitted from the display. The grounding may include connecting the bezel to ground through the conductive traces. The method may also include connecting each of the conductive traces to a touch screen control board through an FPC connector.

Also disclosed is a touch screen system for an electronic device having a power source and a touch screen control board. The touch screen system includes a transparent substrate having an external surface and an internal surface, the transparent substrate for receiving a contact from an object upon the external surface; a pattern of conductive traces arranged about a perimeter of the internal surface of the transparent substrate, where the conductive traces are deposited directly upon the internal surface of the transparent substrate; one or more acoustic sensors associated with the transparent substrate, where the acoustic sensors receive an acoustic wave generated by the contact and convert the acoustic wave to an electronic signal, and where the acoustic sensors are electrically connected through a first one of the conductive traces; and a plurality of capacitive sensors associated with the transparent substrate, each of the capacitive sensors comprising a first electrode that is spaced a distance from a second electrode, wherein each of the first electrodes is both formed by and electrically connected through a second one of the conductive traces and each of the second electrodes is electrically connected through a third one of the conductive traces, and where the contact of the object causes a capacitive change in the capacitive sensors.

The touch screen system may further include an isolation layer deposited upon the conductive traces, a display having an active display area, and a conductive bezel that frames a perimeter of the active display area. The conductive bezel may substantially abut the isolation layer and may be connected to ground.

The touch screen system may further include one FPC connector that electrically interconnects each of the conductive traces with the touch screen control board. Further, the touch screen system may include a processor for monitoring the electronic signal and the capacitive change. The processor may analyze the electronic signal to determine a location of the object upon the transparent substrate and the capacitive change to determine whether the object remains in continuous contact with the transparent substrate.

DETAILED DESCRIPTION

While the embodiments of the invention are susceptible to various modifications and alternative forms, specific embodiments thereof have been shown by way of example in the drawings and are herein described in detail. It should be understood, however, that the description is not intended to limit the invention to the particular form disclosed, but rather, the invention is to cover all modifications, equivalents, and alternatives of embodiments of the invention as defined by the claims.

As discussed above, acoustic touch screen technology excels in detecting a location at which an object contacts a touch screen substrate (hereinafter "position sensing") but is generally unable to sense whether the object remains in continuous contact with the substrate, or whether the object is being held against the substrate (hereinafter "hold-and-release sensing"). To remedy this problem, a simplified capacitance sensing structure has been combined with acoustic sensing technology to create a touch screen system that achieves both effective hold-and-release sensing and position sensing in an elegant design that may be manufactured according to a simplified manufacturing process.

Figure 1A:
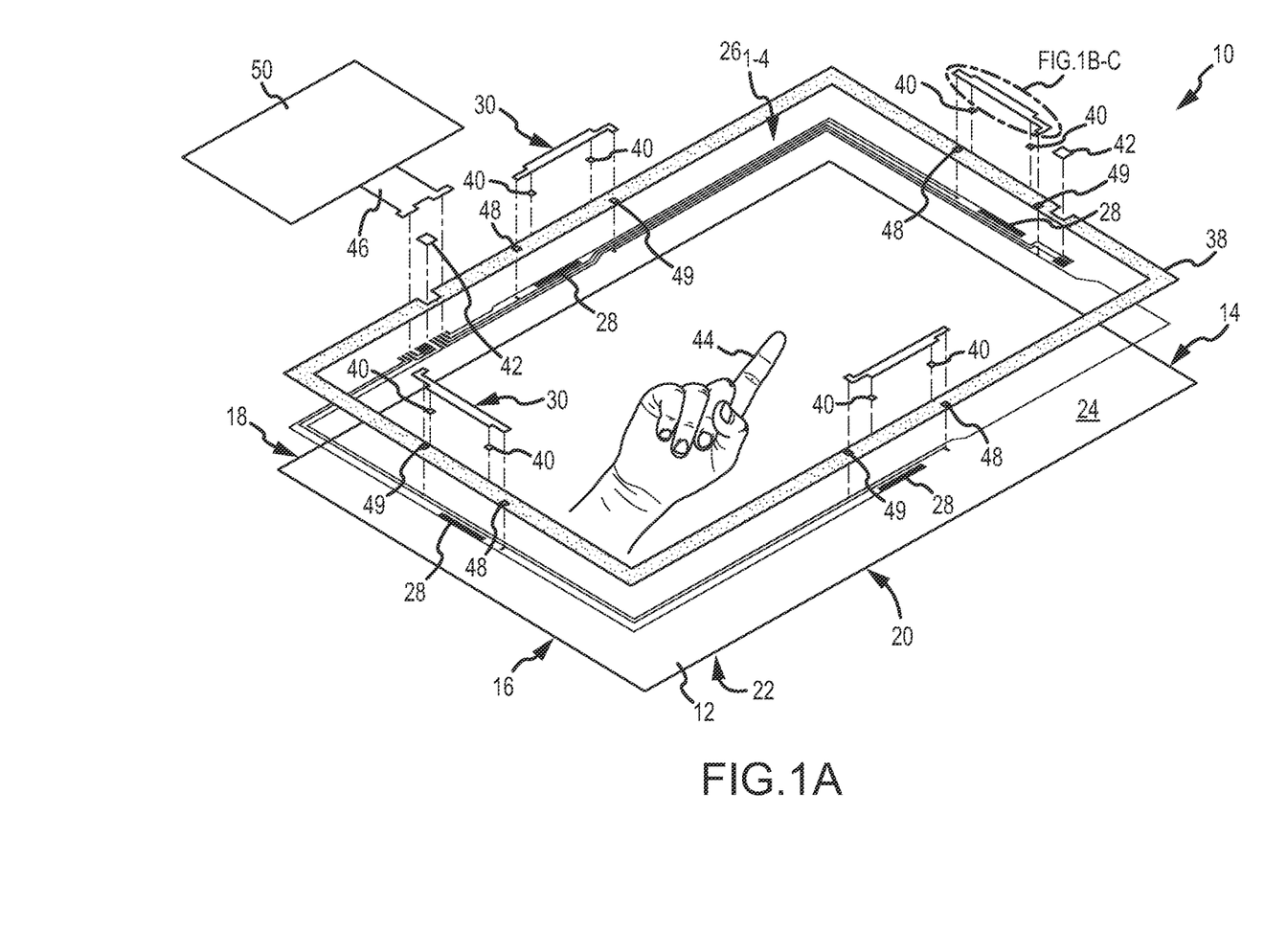
FIG. 1A shows an exploded bottom perspective view of one embodiment of a touch screen assembly as electrically interconnected to a touch screen control board via a flexible printed circuit connector.

FIG. 1A shows an exploded view of one embodiment of a touch screen assembly 10 as electrically interconnected to a touch screen control board 50 having various electronic components that will be described in detail below. In this embodiment, the touch screen assembly 10 includes a transparent substrate 12 having top, bottom, left, and right edges 14, 16, 18, and 20, respectively. The transparent substrate 12 also has an external surface 22 that receives a contact of an object 44 (e.g., a finger, a stylus, a pen, a credit card, etc.) and an internal surface 24, which lies adjacent to an interior of an associated electronic device (not shown) such as, for instance, a mobile phone, a portable display, an electronic book, a laptop, a television, an automotive display, or the like. The transparent substrate 12 may be formed of any appropriate transparent material including, for example, glass or plastic.

Figure 2:
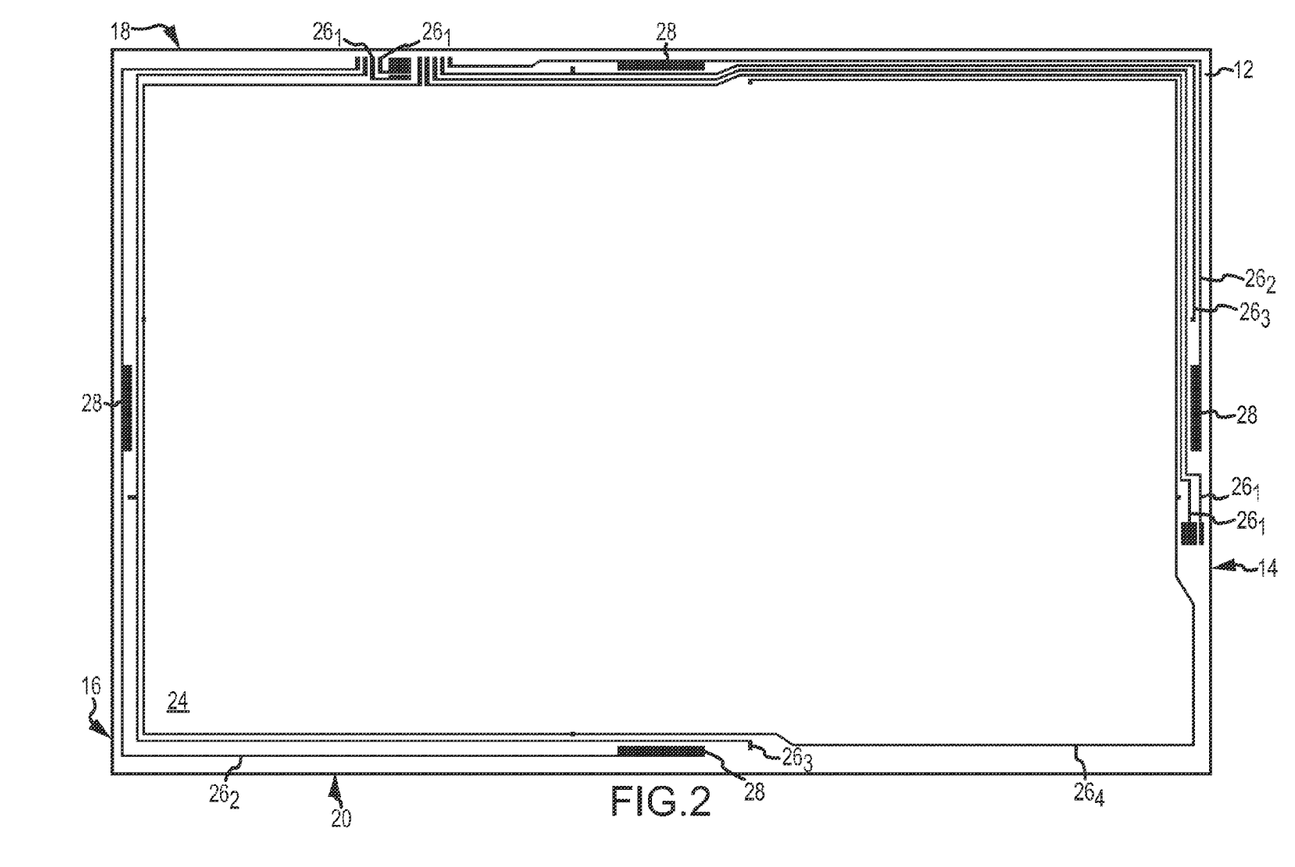
FIG. 2 shows a top view of several conductive traces as deposited on an internal surface of a transparent substrate included in the touch screen assembly of FIG. 1A.

A number of conductive traces $26_{1-4}$ may be deposited in an annular arrangement about a perimeter of the internal surface 24 of the transparent substrate 12. The conductive traces $26_{1-4}$ may be printed or otherwise deposited directly onto the interior surface of the transparent substrate 12 and may be formed of any appropriate conductive material such as, for example, silver. FIG. 2 shows a detailed schematic of the placement of each of the conductive traces $26_{1-4}$ upon the internal surface 24 of the transparent substrate 12. The traces $26_{1-4}$ are electrically connected to the touch screen control board 50 via a single connector 46. The connector 46 may be any appropriate connector and, in one embodiment, the connector 46 is a flexible printed circuit (FPC) connector that is configured to receive inputs from each of the conductive traces $26_{1-4}$.

While the functionality of each of the traces $26_{1-4}$ will be explained in greater detail below, it should be noted that each of the conductive traces $26_{1-3}$ is a pair of conductive traces. That is, as shown in FIGS. 1A and 2, a trace or traces from each pair of conductive traces $26_{1-3}$ is deposited along the top and left edges 14, 18 of the interior surface 24 of the transparent substrate 12, and another trace or traces from each pair of conductive traces $26_{1-3}$ is deposited along the bottom, left, and/or right edges 16, 18, 20 of the interior surface 24 of the transparent substrate 12.

An insulating or isolation layer 38 may be deposited as an annular structure that lies directly upon the conductive traces $26_{1-4}$. The isolation layer 38 may be formed of any appropriate electrically insulating material such as, for example, polyvinylchloride or an electrically insulating tape.

To achieve accurate position sensing as discussed above, acoustic sensors or transducers 42 may be positioned along one or more edges 14, 16, 18, and 20 of the transparent substrate 12 such that the acoustic transducers 42 are in electrical contact with a pair of first conductive traces $26_1$ (FIG. 2). For instance, in this embodiment, the acoustic transducers 42 are positioned along the top edge 14 and the left edge 18 of the transparent substrate. When an object 44 contacts the external surface 22 of the transparent substrate 12, the impact generates an acoustic or bending (i.e., mechanical) wave that propagates through the transparent substrate 12 to be received at the acoustic transducers 42. The acoustic transducers 42 may be piezoelectric crystals or any other acoustic transducers of any appropriate size, shape, type, and/or configuration. While the acoustic transducers 42 are aligned with the top and left edges 14 and 18 of the transparent substrate 12 in this embodiment, the acoustic transducers 42 may be placed at any appropriate position(s) relative to the transparent substrate 12.

Upon a contact of an object 44 against the external surface 22 of the transparent substrate 12, a resulting bending wave propagates through the substrate 12 and is received at the acoustic transducers 42. The acoustic transducers 42 convert the bending wave to an analog electronic signal, which may be transmitted from the acoustic transducers 42, along the first conductive traces $26_1$, and to the touch screen control board 50 via the connector 46 for processing to determine a location (e.g., X, Y coordinates) of the contact of the object 44 against the external surface 22 of the transparent substrate 12. Details relating to position sensing processing will be discussed below with reference to FIG. 4.

Because only an initial contact or a subsequent movement creates acoustic or bending waves that propagate through the transparent substrate 12, the acoustic sensors 42 are not sufficient to detect a "hold" that occurs when the object 44 is held in continuous contact with the substrate 12. Thus, one embodiment of the touch screen assembly 10 also includes four simplified capacitive sensors positioned along the top, bottom, left, and right edges 14, 16, 18, and 20 of the internal surface 24 of the transparent substrate 12. Each capacitive sensor is formed from a first electrode 28 that is spaced apart from a second electrode 34 (FIG. 1B) that is formed on strip or band 30 of FPC material such as, for example, a polyimide substrate or base.

Figures 1B, 1C:
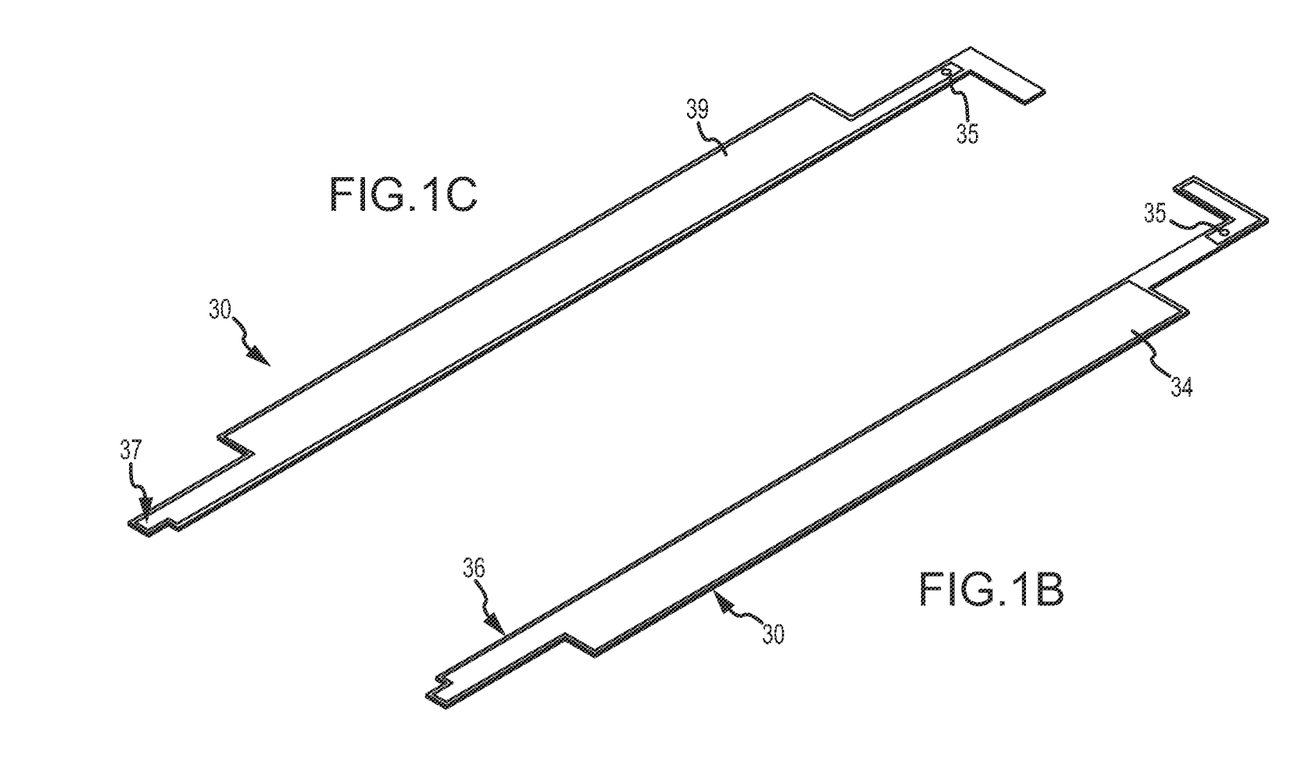
FIG. 1B shows a perspective view of a first side of a flexible printed circuit band for inclusion in the touch screen assembly of FIG. 1A.
FIG. 1C shows a perspective view of a second side of a flexible printed circuit band for inclusion in the touch screen assembly of FIG. 1A.

In further detail and as shown in FIG. 1A, each of the first electrodes 28 is incorporated within a pattern of a second conductive trace $26_2$ that is deposited upon the internal surface 24 of the transparent substrate 12. As shown in FIG. 1B, each of the second electrodes 34 is formed on the FPC band 30. More specifically, a first side 36 of the FPC band 30 may be coated with a conductive material such as copper. Each of the FPC bands 30 may be assembled into the touch screen assembly 10 such that the first side 36 faces the first electrode 28 and is electrically connected to a third conductive trace $26_3$ (FIG. 2) through an access aperture 48 in the isolating layer 38. As a result, the conductive material on the first side 36 of the FPC band 30 forms a second electrode 34, and each pair of the first and second electrodes 28 and 34 combines to form a capacitive sensor.

In this embodiment, each of the first electrodes 28 and the second electrodes 34 may be separated by the isolating layer 38 as well as one or more flexible gaskets 40. The flexible gaskets 40 may be formed of an insulating material having any appropriate size, shape, type, and/or configuration. In one embodiment, the flexible gaskets 40 may be formed from double sided foam tape having approximate length, width, and thickness dimensions of 0.6 mm×0.6 mm×0.15 mm.

Figure 3:
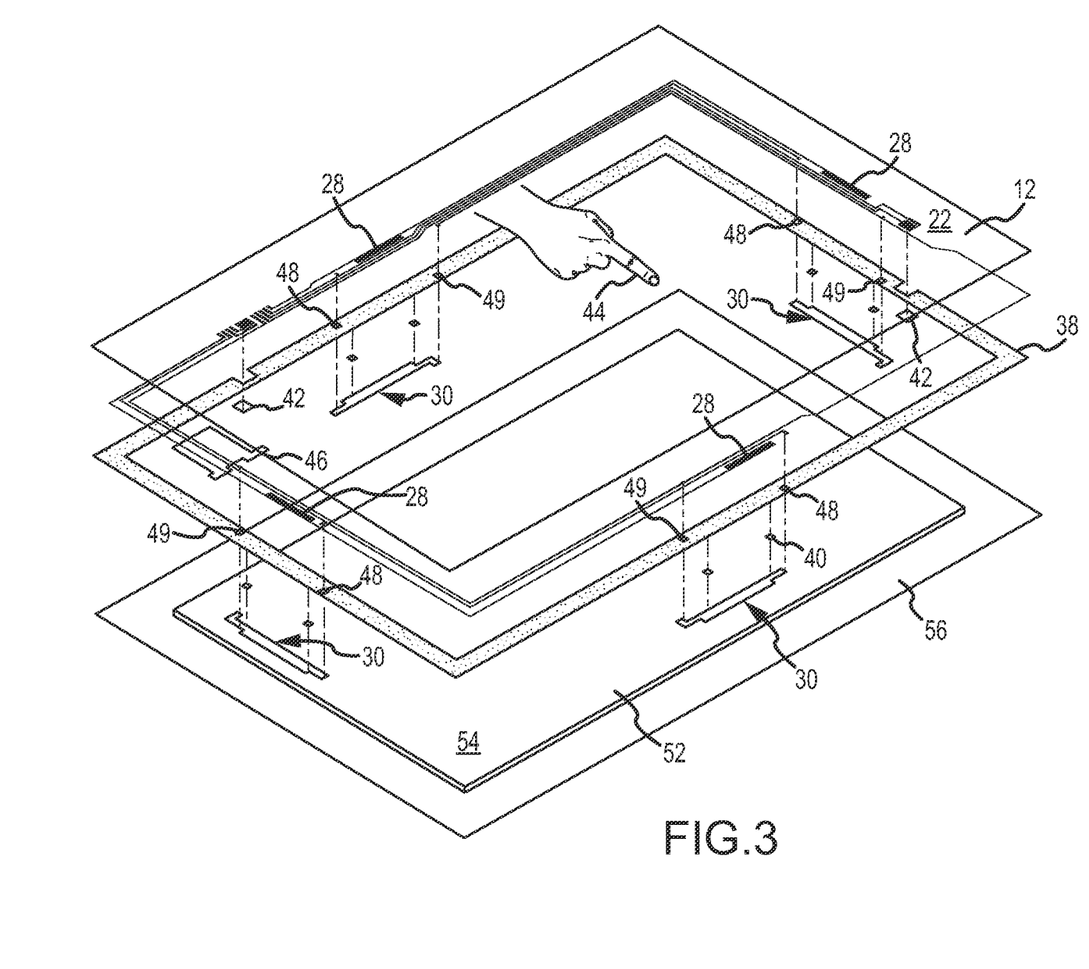
FIG. 3 shows an exploded top perspective view of the touch screen assembly of FIG. 1A as disposed above one embodiment of an associated display and bezel.

The touch screen assembly 10 may be positioned above a display 52, as shown in FIG. 3. The display 52 may be any of several types of displays, including DLP® displays, LCOS displays, TFT displays, other LC display types and/or brands, OLED displays, or any other suitable display types. The display 52 may have an active display area 54 with which a user may indirectly interact using the object 44, as discussed above. Thus, because the display 52 lies below the touch screen assembly 10, any portions of the touch screen assembly 10 that directly overlay the active display area 54 of the display 52 are preferably transparent so as to allow a user to see through the assembly 10 to the active display area 54.

Figure 4:
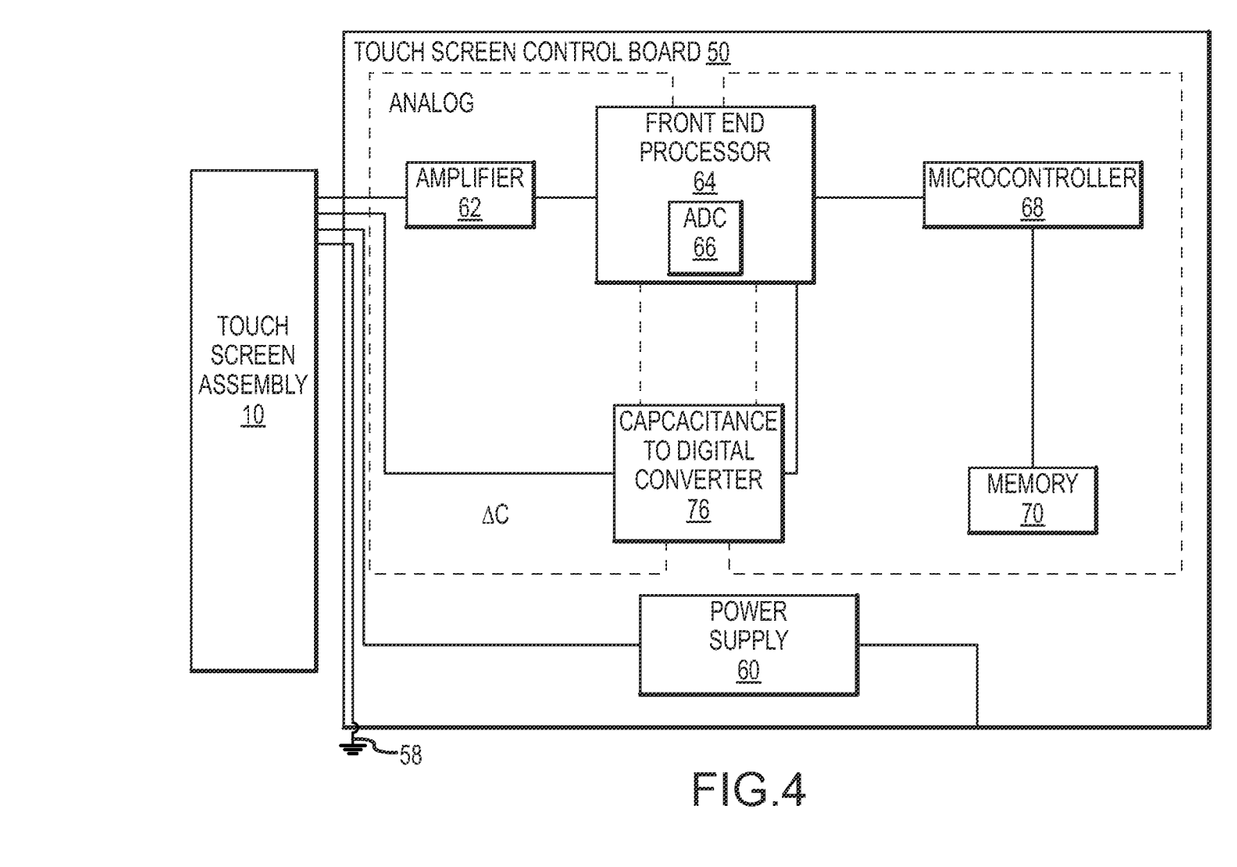
FIG. 4 shows a functional diagram of the touch screen control board of FIG. 1A.

The display 52 may include a bezel 56 that frames the active display area 52. The bezel may be formed of any appropriate conductive material such as aluminum or another appropriate metal. To shield the electronic components of the touch screen assembly 10 (e.g., the conductive traces $26_{1-4}$, the first and second electrodes 28, 34, the acoustic transducers 42) from electromagnetic radiation emitted from the display 52, the display 52 may be connected to ground 58 on the touch screen control board 50 (FIG. 4). For instance, the bezel 56 may be electrically connected to ground 58 through a fourth conductive trace $26_4$ (FIG. 2). In this regard, the bezel 56 negates any need to deposit additional shielding layers between the isolation layer 38 and the display 52 to protect against electromagnetic interference caused by the display. As a result, when the display 52 and the bezel 56 are disposed below the touch screen assembly 10, the bezel 56 may substantially abut the isolation layer 38, as shown in FIG. 3.

In addition, as shown in FIG. 1C, a second side 37 of the FPC band 30, discussed above, may also be coated with conductive material (e.g., copper) and be connected to ground 58 (FIG. 4) in any appropriate manner, thereby forming a grounding plate 39 that provides additional shielding against electromagnetic radiation emitted from the display 52 in order to achieve more exact hold-and-release sensing between the first and second electrodes 28 and 34. In one implementation, each of the the grounding plates 39 may be connected to ground 58 (FIG. 4) through the fourth conductive trace $26_4$. A through hole 35 may conduct the grounding plate 39 from the second side 37 of the FPC band 30 to the first side 36 of the FPC band 30, where it is bonded to the fourth conductive trace $26_4$ as accessed through an aperture 49 in the isolation layer 38.

In operation, a power supply 60 associated with the touch screen control board 50 (FIG. 4) may apply an analog voltage (which alternatively may be referred to as a stimulus signal) to charge the capacitive sensors. When a user touches the external surface 22 of the transparent substrate 12 with the object 44, the pressure of the object 44 compresses the flexible gaskets 40, thereby reducing the distance between the first and second electrodes 28 and 34. Because the capacitance of each pair of first and second electrodes 28 and 34 is a function of the distance between the first and second electrodes 28 and 34, this compression causes a measurable capacitance variation, ΔC, within the capacitive sensors. This ΔC may be detected and converted into a binary signal for a hold or release action at the touch screen control board 50, and discussed below.

FIG. 4 shows a functional block diagram of one embodiment of the touch screen control board 50. In this embodiment, the touch screen control board 50 includes the power supply 60, which receives power from an external power source (not shown) such as, for example, a battery. The power supply 60 may be coupled with each component on the touch screen control board 50 to provide the desired form of voltage to each component. In addition, one or more of the components may be connected to ground 58. For ease of illustration, these internal connections are not shown. The touch screen control board 50 also includes a number of additional components for carrying out the control and processing functionality of the touch screen assembly 10, and it should be noted that any appropriate variation of these individual components and/or the configuration of the components is contemplated.

With respect to determining a location of the object 44 in contact with the transparent substrate 12, the electronic signal received at the acoustic transducers 42 may be amplified either at the acoustic transducers 22 or at an amplifier 62 on the touch screen control board 50. The amplified signal is passed to a front end processor 64, which may include an analog-to-digital (A/D) converter 66. The A/D converter 66 digitizes the amplified signal and transmits the digitized data to a microcontroller 68, which processes the digitized data to determine a location (i.e., X, Y coordinates) of the object 44 relative to the transparent substrate 12.

Figure 5A:
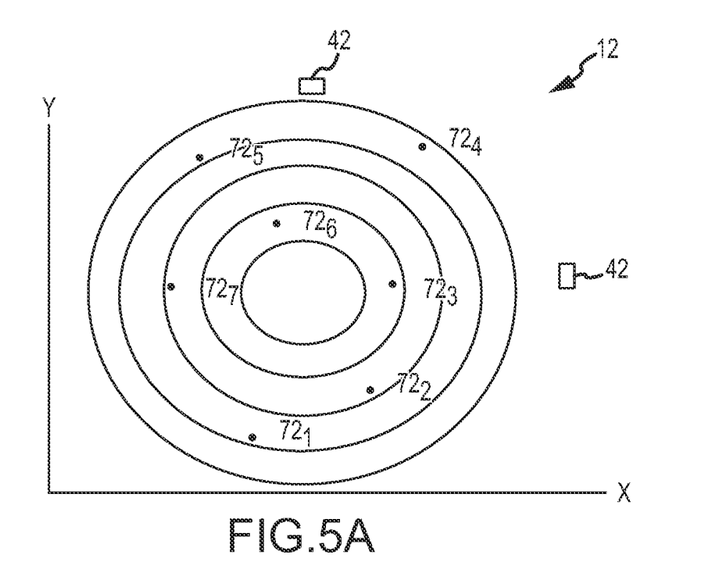
FIG. 5A shows a functional diagram of a transparent substrate included in the touch screen assembly of FIG. 1A.
Figure 5B:
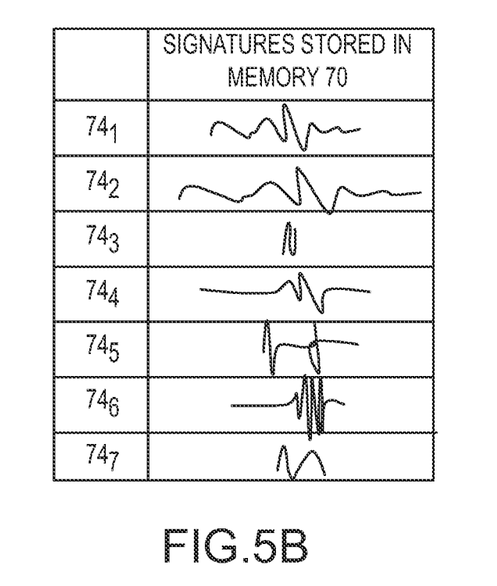
FIG. 5B shows several acoustic signatures that correspond to exemplary points of impact upon the transparent substrate shown in FIG. 5A.

To make this positional determination, the microcontroller 68 accesses a memory 70 and compares the digitized data received from the acoustic transducers 42 with data stored at the memory 70. The stored data represents a number of unique waves, or signatures, that are generated from impacts at known locations relative to the transparent substrate 12 during the manufacturing process. For example, FIG. 5A shows a number of known impact points $72_{1-7}$ relative to the transparent substrate 12. Contacting the substrate 12 at each of the impact points $72_{1-7}$ produces a number of corresponding wave signatures $74_{1-7}$, shown in FIG. 5B. The signatures $74_{1-7}$ and their corresponding X, Y coordinates $72_{1-7}$ are stored in the memory 70 for use by the microcontroller 68 in determining where the object 44 is contacting the external surface 22 of the transparent substrate 12 during use of the touch screen assembly 10. While FIG. 5B shows signatures that correlate with only seven impact points $72_{1-7}$, any appropriate number of signatures may be stored in the memory 70 (e.g., 1000 points, 4000 points, etc.). Further, if a signature correlating to the impact point is not included in the stored data, the microcontroller 68 may execute an algorithm to extrapolate the location based on the closest impact point that is included in the stored data. Based on this comparison and/or calculation, the microcontroller 68 outputs the X, Y coordinates of the impact point for use in interacting with the display 52 and controlling the electronic device (not shown) as desired by the user.

The touch screen control board 50 also includes components that process the capacitance change, ΔC, which results when the object 44 contacts the external surface 22 of the transparent substrate 12. Specifically, a determination is made regarding whether the object 44 is being held in continuous contact with the transparent substrate 12 after the initial contact. In one embodiment, the ΔC may register on a capacitance-to-digital converter (CDC) 76 on the touch screen control board 50, where the ΔC may be converted to a discrete voltage level. The CDC 76 may be any appropriate CDC, and one suitable example includes the AD7150 capacitance converter from Analog Devices, Inc. The discrete voltage level output from the CDC 76 may correlate with whether or not the object 44 is in contact with the transparent substrate 12. Further, the discrete voltage level may be routed through the A/D converter 66 of the front end processor 64 for further processing before it is sent to the microcontroller 68, which may, in turn, execute logic that determines whether the object 44 is in contact with transparent substrate 12 based on the discrete voltage level. For example, the microprocessor 68 may be programmed to determine that the object 44 is contacting the substrate 12 when the discrete voltage level is at or below a predefined voltage $V_{touch}$ (e.g., 3.3 V) and that the object 44 has been removed from the substrate 12 when the discrete voltage level is above the predefined voltage $V_{touch}$.

In an alternative embodiment, the ΔC may register on a resistor-capacitor circuit (RC circuit) (not shown) on the touch screen control board 50, thereby altering the charge/discharge time, or oscillation frequency, of the RC circuit. The voltage output from the RC circuit may be passed to the A/D converter 66, which monitors the change in output voltage versus time in order to track the oscillation frequency of the RC circuit. The microcontroller 68 may then use the output from the A/D converter 66 to recognize a hold and release action, or whether the object 44 is in contact with the external surface 22 of the transparent substrate 12.

Using this capacitive sensing technology in combination with the acoustic sensing technology described above allows the touch screen assembly 10 to not only determine the location of an object that contacts the transparent substrate 12 but also whether the object is held against the substrate 12 for a period of time. This is accomplished without connecting the capacitive sensors using soldered conductive wire and without the need for printed or deposited shielding layers upon the transparent substrate 12, thereby reducing the time, complexity, and expense associated with manufacturing the touch screen assembly 10 and increasing the accuracy and reliability of the hold-and-release sensing mechanism of the system. Furthermore, the acoustic sensing and hold-and-release sensing components of the touch screen assembly 10 are transmitted to the touch screen control board 50 via a single connector 46, thereby reducing the footprint associated with the mechanical design and making the touch screen assembly 10 feasible for increasingly smaller electronic devices.

While the embodiments of the invention have been illustrated and described in detail in the drawings and foregoing description, such illustration and description is to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

What is claimed is:

1. A touch screen system for an electronic device having a power source and a touch screen control board, comprising:
    a transparent substrate having an external surface and an internal surface, the transparent substrate for receiving a contact from an object upon the external surface;
    deposited layers arranged about a perimeter of the internal surface of the transparent substrate, the deposited layers consisting of:
        a conductive layer deposited upon the internal surface of the transparent substrate, wherein the conductive layer forms a pattern of conductive traces; and
        an isolation layer deposited upon the conductive layer;
    one or more acoustic sensors associated with the transparent substrate, wherein the acoustic sensors receive an acoustic wave generated by the contact and convert the acoustic wave to an electronic signal, and wherein the acoustic sensors are electrically connected through a first one of the conductive traces; and
    a plurality of capacitive sensors associated with the transparent substrate, each of the capacitive sensors comprising a first electrode that is spaced a distance from a second electrode, wherein each of the first electrodes is both formed by and electrically connected through a second one of the conductive traces and each of the second electrodes is electrically connected through a third one of the conductive traces, wherein the isolation layer is disposed between the first and second electrodes of each of the capacitive sensors, and wherein the contact of the object causes a capacitive change in the capacitive sensors.

2. The touch screen system as defined in claim 1, further comprising a processor for monitoring the electronic signal and the capacitive change, wherein the processor analyzes the electronic signal to determine a location of the object upon the transparent substrate and the capacitive change to determine whether the object remains in continuous contact with the transparent substrate.

3. The touch screen system as defined in claim 1, further comprising one flexible printed circuit (FPC) connector, wherein the one FPC connector electrically connects each of the conductive traces with the touch screen control board to thereby electrically interconnect both the one or more acoustic sensors and the plurality of capacitive sensors to the touch screen control board.

4. The touch screen system as defined in claim 1, further comprising a compressible gasket situated between the first and second electrodes of each of the capacitive sensors.

5. The touch screen system as defined in claim 4, wherein the compressible gasket is formed of a double-sided foam tape.

6. The touch screen system as defined in claim 1, wherein one of the capacitive sensors is positioned at an approximate middle point along each edge of the internal surface of the transparent substrate.

7. The touch screen system as defined in claim 1, wherein each of the second electrodes comprises a first electrically conductive area deposited upon a first side of a flexible printed circuit (FPC) strip.

8. The touch screen system as defined in claim 7, wherein the FPC strip comprises a second side having a second electrically conductive area, and wherein the second electrically conductive area is grounded through a fourth one of the conductive traces such that the second electrically conductive area provides electromagnetic radiation shielding.

9. The touch screen system as defined in claim 8, further comprising a plurality of access apertures extending through the isolation layer, wherein each second electrically conductive area is electrically connected to the fourth one of the conductive traces via a different one of the plurality of access apertures.

10. The touch screen system as defined in claim 9, wherein each first electrically conductive area is electrically connected to the third one of the conductive traces via a different one of the plurality of access apertures.

11. The touch screen system as defined in claim 1, further comprising:
    a display having an active display area; and
    a conductive bezel framing a perimeter of the active display area, wherein the conductive bezel shields the acoustic sensors, the capacitive sensors, and the conductive traces from electromagnetic radiation emitted from the display.

12. The touch screen system as defined in claim 1, wherein the acoustic wave is a bending wave.

13. The touch screen system as defined in claim 1, further comprising a plurality of access apertures extending through the isolation layer, wherein each second electrode is electrically connected to the third one of the conductive traces via a different one of the plurality of access apertures.

14. The touch screen system as defined in claim 1, wherein the first and second electrodes of each capacitive sensor are spaced in a direction extending away from the internal surface of the transparent substrate.

15. A method of analyzing a contact from an object upon a touch screen system, comprising:
    providing a transparent substrate having external and internal surfaces;
    depositing layers, other than shielding layers, on the internal surface of the transparent substrate, the depositing comprising:
        depositing a layer of conductive material to form an annular pattern of conductive traces about a perimeter of the internal surface of the transparent substrate, wherein the conductive traces form a plurality of first electrodes; and
        depositing a layer of insulating material upon the layer of conductive material;
    connecting a plurality of second electrodes to the conductive traces, wherein the insulating material spaces each of the second electrodes a distance from one of the first electrodes such that each pair of the first and the second electrodes forms a capacitive sensor, and wherein the contact of the object causes a capacitive change in the capacitive sensors; and connecting one or more acoustic sensors to the conductive traces, wherein the acoustic sensors receive an acoustic wave generated by the contact from the object and convert the acoustic wave to an electronic signal.

16. The method as defined in claim 15, further comprising:
associating a processor with the conductive traces; and
upon the contact of the object with the external surface of the transparent substrate, using the processor to:
monitor the electronic signal to determine a location of the object upon the transparent substrate; and
monitor the capacitive change to determine whether the object remains in continuous contact with the transparent substrate.

17. The method as defined in claim 15, wherein each of the second electrodes comprises a first electrically conductive area deposited upon a first side of a flexible printed circuit (FPC) strip.

18. The method as defined in claim 17, wherein the FPC strip comprises a second side having a second electrically conductive area, and wherein the method further comprises:
grounding the second electrically conductive area through the conductive traces such that the second electrically conductive area provides electromagnetic radiation shielding.

19. The method as defined in claim 15, further comprising:
associating a display and a conductive bezel with the transparent substrate, wherein the display has an active display area and the conductive bezel frames a perimeter of the active display area such that the conductive bezel aligns with the layer of conductive material; and
grounding the conductive bezel such that the bezel shields the acoustic sensors, the capacitive sensors, and the conductive traces from electromagnetic radiation emitted from the display.

20. The method as defined in claim 19, wherein the grounding comprises connecting the conductive bezel to ground through the conductive traces.

21. The method as defined in claim 15, further comprising:
connecting each of the conductive traces to a touch screen control board through a flexible printed circuit (FPC) connector.

22. A touch screen system for an electronic device having a power source and a touch screen control board, comprising:
a transparent substrate having an external surface and an internal surface, the transparent substrate for receiving a contact from an object upon the external surface;
a pattern of conductive traces arranged about a perimeter of the internal surface of the transparent substrate, wherein the conductive traces are deposited directly upon the internal surface of the transparent substrate;
an isolation layer deposited upon the conductive traces;
one or more acoustic sensors associated with the transparent substrate, wherein the acoustic sensors receive an acoustic wave generated by the contact and convert the acoustic wave to an electronic signal, and wherein the acoustic sensors are electrically connected through a first one of the conductive traces; and
a plurality of capacitive sensors associated with the transparent substrate, each of the capacitive sensors comprising a first electrode that is spaced a distance from a second electrode, wherein each of the first electrodes is both formed by and electrically connected through a second one of the conductive traces and each of the second electrodes is electrically connected through a third one of the conductive traces, wherein the isolation layer is disposed between the first and second electrodes of each of the capacitive sensors, and wherein the contact of the object causes a capacitive change in the capacitive sensors.

23. The touch screen system as defined in claim 22, further comprising:
a display having an active display area; and
a conductive bezel that frames a perimeter of the active display area, wherein the conductive bezel substantially abuts the isolation layer, and wherein the conductive bezel is connected to ground.

24. The touch screen system as defined in claim 22, further comprising one flexible printed circuit (FPC) connector, wherein the FPC connector electrically interconnects each of the conductive traces with the touch screen control board to thereby electrically interconnect both the one or more acoustic sensors and the plurality of capacitive sensors to the touch screen control board.

25. The touch screen system as defined in claim 22, further comprising a processor for monitoring the electronic signal and the capacitive change, wherein the processor analyzes the electronic signal to determine a location of the object upon the transparent substrate and the capacitive change to determine whether the object remains in continuous contact with the transparent substrate.

26. The touch screen system as defined in claim 22, wherein each second electrode is electrically connected to the third one of the conductive traces via an access aperture extending through the isolation layer.

* * * * *